(12) United States Patent
Dilber

(10) Patent No.: US 6,368,570 B1
(45) Date of Patent: Apr. 9, 2002

(54) PROCESS FOR MANUFACTURING CARO'S ACID

(75) Inventor: Iihan R. Dilber, Wilmette, IL (US)

(73) Assignee: FMC Corporation, Philadelphia, PA (US)

( * ) Notice: Subject to any disclaimer, the term of this patent is extended or adjusted under 35 U.S.C. 154(b) by 918 days.

(21) Appl. No.: 08/589,673

(22) Filed: Jan. 22, 1996

(51) Int. Cl.⁷ .............................................. C01B 15/08
(52) U.S. Cl. ...................................... 423/513; 423/521
(58) Field of Search ................................. 423/513, 521

(56) References Cited

U.S. PATENT DOCUMENTS

| | | | |
|---|---|---|---|
| 2,926,998 A | * 3/1960 | D'Addieco et al. | 423/521 |
| 3,900,555 A | * 8/1975 | Jourdan-Laforte | 423/365 |
| 3,939,072 A | * 2/1976 | Laforte | 210/96 R |
| 4,915,849 A | * 4/1990 | Griffiths et al. | 210/759 |
| 5,439,663 A | * 8/1995 | Manganaro et al. | 423/521 |
| 5,470,564 A | * 11/1995 | Manganaro et al. | 423/521 |

FOREIGN PATENT DOCUMENTS

| | | | |
|---|---|---|---|
| WO | WO 92/0779 | 5/1992 | C01B/15/06 |
| WO | WO92/11200 | 7/1992 | C01B/15/06 |

OTHER PUBLICATIONS

"Static Mixing Technology", Copyright 1991, Koch Engineering Company, pp. 1–4 and 9–10 (No Author, No Publication Month).*

* cited by examiner

Primary Examiner—Steven P. Griffin
Assistant Examiner—Timothy C Vanoy
(74) Attorney, Agent, or Firm—FMC Corporation

(57) ABSTRACT

A process is disclosed for producing Caro's acid by introducing hydrogen peroxide of at least 50% by weight through a first fed line into a first reactor conduit sulfuric acid having a concentration of at least 85% by weight through a second feed line into a second reactor conduit independently into a baffled, plug flow mixing reactor without substantial premixing of the sulfuric acid and the hydrogen peroxide, and removing a Caro's acid reaction mixture from the exit end of the plug flow mixing reactor.

2 Claims, 1 Drawing Sheet

PROCESS FOR MANUFACTURING CARO'S ACID

TECHNICAL FIELD

The invention is in the field of producing Caro's acid by reaction of hydrogen peroxide and sulfuric acid in a controlled and effective manner.

BACKGROUND ART

Caro's acid, $H_2SO_5$, is also known as peroxymonosulfuric acid. It is a strong oxidizing compound which has been used in many applications including purification of cyanide-containing effluents by conversion of their cyanides into non-toxic derivatives. Caro's acid is usually produced by reacting sulfuric acid with hydrogen peroxide to produce an equilibrium mixture of Caro's acid containing peroxymonosulfuric acid, sulfuric acid, hydrogen peroxide and water. However, since the Caro's acid is not stable for long periods it must be made and immediately used on site or quickly cooled and stored by refrigeration. In general, the Caro's acid is manufactured on site only as needed to avoid storing any excess amounts.

One procedure for producing Caro's acid is set forth in U.S. Pat. No. 3,900,555 by using an apparatus described in U.S. Pat. No. 3,939,072 for mixing the sulfuric acid and hydrogen peroxide and cooling the mixture with a water-cooled jacket to prevent overheating of the reactants and premature decomposition of the monoperoxysulfuric acid product. These patents teach the use of the monoperoxysulfuric acid product for treating waste aqueous effluents from an electroplating plant containing cyanide ions while simultaneously adding an alkali in amounts suitable to maintain the solution at pH 9.

Another procedure is set forth in U.S. Pat. No. 4,915,849 where the Caro's acid is used to treat cyanide-containing effluents from an ore-processing plant. The Caro's acid is manufactured by reacting sulfuric acid with hydrogen peroxide in proportions corresponding to between 0.01 and 0.5 moles of sulfuric acid per mole of hydrogen peroxide. The resulting acid is then added to the cyanide-containing effluent simultaneous with aqueous lime or sodium hydroxide mixtures in order to maintain the effluent at the preferred pH of between 9.5 and 11.5.

PCT Publication No. WO 92/07791, a published patent application of Lane et al, teaches the production of peroxymonosulfuric acid by introducing a hydrogen peroxide solution into a stream of sulfuric acid flowing through a reaction chamber, the $H_2O_2$ introduction being intermediate the sulfuric acid inlet and the reaction mixture outlet. Both the hydrogen peroxide solution and sulfuric acid are introduced under pressure into the closed tubular reaction chamber of the invention. In the reaction chamber, the through-put per minute of the reaction chamber is at least about 20 times its internal volume measured between the inlet for the hydrogen peroxide and the outlet.

Another PCT application, Publication No. WO 92/11200 to McDonogh et al. teaches the use of substoichiometric amounts of sulfuric acid to avoid the need to neutralize part of the acid for some applications. However, the conversion of hydrogen peroxide to Caro's acid is too low to be economical for most large scale applications.

U.S. Pat. Nos. 5,439,663 and 5,470,564, incorporated herein by reference are both to Manganaro et al.; both teach processes for preparing Caro's acid by reacting sulfuric acid having a concentration of at least about 85% by weight and hydrogen peroxide having a concentration of at least about 50% by weight by weight, wherein the sulfuric acid and hydrogen peroxide are fed through separate feed lines into a funneling zone open to the atmosphere, the feed lines having air gaps between their ends and the funneling zone; continuing to introduce the sulfuric acid and the hydrogen peroxide into the funneling zone to flow and mix within the funneling zone, passing the resulting mixture by gravity flow into one end of a reaction zone whose size permits a pressure drop which is at least 8 times the theoretical pressure drop for such reaction zone and removing a mixture containing Caro's acid from the exit end of the reaction zone. Although the process eliminates many problems of the prior art, particularly safety problems, decomposition within the funneling zone is undesirable and results in an increased pressure drop in the reactor, resulting in the high pressure drop therein and lowering the throughput. These two patents are very valuable in that they disclose how to eliminate two important safety problems inherent in prior processes; contamination of the hydrogen peroxide feed tanks, and the overflow or rupture of reaction vessels caused by uncontrolled decomposition.

It has been the custom in the industry to isolate the storage tank of hydrogen peroxide from the reactor where Caro's acid is produced by means of an intermediate tank (sometimes called a "break" tank) to interrupt the stored hydrogen peroxide source from the line delivering hydrogen peroxide to the Caro's acid generator. The peroxide from the storage tank is passed by pump means or by gravity into the top of an intermediate tank to a given level in the intermediate tank without requiring a direct liquid connection between the peroxide in the intermediate tank and the line flowing from the storage tank. This assures that any contamination which may back up from the Caro's acid generator into the intermediate tank will not be able to enter the hydrogen peroxide storage tank.

DISCLOSURE OF THE INVENTION

We have now found a process for producing Caro's acid by introducing hydrogen peroxide having a concentration of at least 50% by weight through a first feed line into a first reactor conduit open to the atmosphere and introducing sulfuric acid having a concentration of at least 85% by weight through a second feed line into a second reactor conduit open to the atmosphere, proportionally adjusting the rate of flow of the hydrogen peroxide into the first reactor conduit and of the sulfuric acid into the second reactor conduit to maintain the desired mole ratio and to provide a hydrostatic head of hydrogen peroxide and of sulfuric acid, thereby independently introducing the hydrogen peroxide from the first reactor conduit and the sulfuric acid from the second reactor conduit by gravity into a baffled, plug flow mixing reactor without substantial premixing of the sulfuric acid and the hydrogen peroxide, and removing a Caro's acid reaction mixture from the exit end of the plug flow mixing reactor.

In carrying out the present process, the Caro's acid is produced by reacting sulfuric acid and hydrogen peroxide together, without substantial premixing. The reaction is essentially adiabatic so that the heat evolved increases the rate formation of the Caro's acid. A very simple and desirable method of discharging the hydrogen peroxide and sulfuric acid from the feel lines into the reactor conduits is for the inlets of the hydrogen peroxide and sulfuric acid reactor conduits to be each expanded, optionally in a cylindrical shape or in a conical shape (funnel form) as taught in U.S. Pat. Nos. 5,439,663 and 5,470,564 so that none of the reaction mixture can overflow and enter into the feed lines of either the hydrogen peroxide and/or sulfuric acid. The ends of the reactor conduits located downstream from the inlets direct the solutions without substantial premixing directly into the baffled, mixing reactor, desirably a pipe-like or tube reactor the baffles convert the energy of the flowing fluid to promote mixing. Most preferably a commercial static mixer such as those available from Koch Engineering Corporation. The mixing reactor may be either vertically oriented, horizontally oriented or any skew angle intermediate these two extremes and is fed by gravity from the reactor conduits. Normally static mixers contain several mixing elements which will ensure a complete mixing and reaction of the two reagents. A very desirable embodiment is for the reactor conduits to be in the form of a single "funnel form" partitioned vertically into a first reactor conduit and a second reactor conduit, the partition reaching to the baffled portion of the mixing reactor to ensure no substantial mixing of the hydrogen peroxide with the sulfuric acid takes place prior to their introduction into the reactor. However, many other equivalent designs could be employed, such as, two coaxial conduits, or two separate conduits combining in a "Y" at the mixing reactor.

The sulfuric acid can be of any concentration from about 85% by weight to up to about 98% by weight $H_2SO_4$ with about 93% weight percent sulfuric acid being preferred because of its ready availability and workability. Hydrogen peroxide can be of any concentration from about 50% by weight weight percent $H_2O_2$ to about 90% weight percent $H_2O_2$ with 70% weight percent hydrogen peroxide preferred because of safety consideration and because the lower amount of water in the 70 weight percent hydrogen peroxide is desirable in this system. The mole ratios of sulfuric acid to hydrogen peroxide ($H_2SO_4/H_2O_2$) can range desirably from about 1/1 to about 3/1 with about 2/1 being preferred. The reaction results in Caro's acid being formed in a solution which is an equilibrium mixture of hydrogen peroxide, sulfuric acid, Caro's acid and water. The equation for this reaction is set forth below:

$$H_2SO_4 + H_2O_2 \rightleftharpoons H_2SO_5 + H_2O$$

In this reaction, the presence of water in the reaction mixture is undesirable since it acts to inhibit formation of $H_2SO_5$ and to hydrolyze the resulting $H_2SO_5$ back into $H_2SO_4$ and $H_2O_2$. For this reason, it is desired to minimize the presence of water by using concentrated sulfuric acid and concentrated hydrogen peroxide to increase the yield of Caro's acid. Further, since sulfuric acid is a very strong dehydrating agent, it is desired to employ excess amounts of sulfuric acid relative to the water formed in the reaction so that it takes up the water as a hydrate and prevents the water from inhibiting the Caro's acid formation in the reaction. However, use of extremely large amounts of sulfuric acid is wasteful since the additional amounts of Caro's acid formed is not commensurate with the cost of the excess sulfuric acid required to obtain the somewhat higher amounts of Caro's acid formed. For these reasons, the optimum ratio for producing Caro's acid commensurate with economical amounts of sulfuric acid employed is obtained when the mole ratio of $H_2SO_4/H_2O_2$ is about 2/1 to about 2.5/1. A typical composition prepared from a mole ratio of 93 weight percent sulfuric acid and 70 weight percent hydrogen peroxide is as follows: Caro's acid (peroxymonosulfuric acid) 25 weight percent; sulfuric acid 57 weight percent; hydrogen peroxide 3.5 weight percent; and water 14.5 weight percent.

It is well known that Caro's acid is not very stable at high temperatures and releases both heat and large volumns of gas (oxygen and steam if above the boiling point). The rate of decomposition increases exponentially with the absolute temperature with the release of heat. The use of a baffled, mixing reactor is critical to the invention because it thoroughly mixes the hydrogen peroxide and sulfuric acid in a very short period of time without backmixing. Concentrated sulfuric acid contains very little water to inhibit the formation of Caro's acid. It also releases sufficient heat (the heat of hydration) when contacted by the aqueous hydrogen peroxide to raise the temperature of the reaction mixture to almost 100° C. in summer months. However, when the Caro's acid reaction mixture reaches about 98° C. it begins to decompose violently because of the increase in the rate of decomposition with temperature.

Unexpectedly, contrary to U.S. Pat. Nos. 5,439,663 and 5,470,564 there is no need in the present invention to size the reactor to permit a pressure drop of at least 8 times the theoretical pressure drop for such reactor owing to accelerated decomposition of the hydrogen peroxide and/or Caro's acid reactant premixed with the with the consequent release of voluminous gases which cause the excessive pressure in those processes. It unexpectedly has been found that when the sulfuric acid and hydrogen peroxide are introduced into the reaction mixture without substantial premixing according to the present invention that sufficient heat is evolved to permit the reaction to take place in a baffled, mixing reactor but without sufficient decomposition to require that the reactor be sized to permit a pressure drop of at least eight times the theoretical. It is not known whether this difference is owing to more complete mixing which avoids local "hot spots" in either the back mixing zones or the funneling zone of the prior art processes, or is merely a function of contact time of the solutions. However, it is most unexpected that the present invention could increase the capacity of a baffled, mixing reactor compared to the prior art processes. In addition, the present invention can result in as much as a 10% increase in conversion of hydrogen peroxide to Caro's acid compared with the process of U.S. Pat. No. 5,470,564.

In one desirable embodiment, the hydrogen peroxide and sulfuric acid reactor conduits discharge empty by gravity into an essentially vertical, pipe-like, static reactor containing 3 or 4 static mixing elements, such as those manufactured by Koch Engineering Company, and designated as SMV (Registered TM) static mixers. These static mixers are advantageous because they result in almost instantaneous reaction, have little hold up, operate in a continuous manner and need no mechanical or moving mixing devices to obtain complete mixing without "hot spots" and reaction to form Caro's acid thereby avoiding formation of a two phase gas/liquid system that limits the flow through the it. The minimal hold up reduces decomposition, heat and pressure buildup and generally avoids run away reactions. The design is such that the hydrogen peroxide and sulfuric acid from the reactor conduits freely drain into the mixing elements of the static mixer with little or no hold up thereby avoiding prolonged residence times, excessive pressure drops, and uncontrolled and unwanted variations in $H_2SO_4/H_2O_2$ mole ratios. Consequently, higher hydrogen peroxide conversion efficiencies can be obtained, and a higher capacity can be obtained from a given static mixer.

In carrying out the present process, the inlet ends of the reactor conduits are always open to the atmosphere to prevent any possible build up of pressure caused by the release of gases during the reaction to form Caro's acid forcing solution the lines supplying either the hydrogen peroxide or sulfuric acid to the reactor conduits. In the event of an unlikely excessive surge of gases, the mixture in the reactor conduits can rise and even overflow the ends of the reactor conduits without contaminating the ends of the feed lines supplying the hydrogen peroxide and sulfuric acid because of the air gap which is always maintained between the discharge ends of these lines and the inlet ends of the reactor conduits. Although not necessary, it is often helpful if the top of the reactor conduits has overflow lines installed to drain any possible overflow of reacting liquids which might back up.

Although it would be preferable if the hydrogen peroxide and sulfuric acid were to be separately introduced directly onto the mixing baffles of the reactor, such an ideal condition is not necessary to obtain the benefits of the invention. For the purpose of this invention the term "without substantial premixing" means that the hydrogen peroxide and the sulfuric acid do not contact each other for more than 1 seconds before they are introduced into the baffled part of the mixing reactor (less than 1 seconds retention time). One skilled in fluid dynamics can easily design flow conditions to ensure that the hydrogen peroxide and sulfuric acid will be introduced into the baffled plug flow reactor before the solutions contact each other, or within 1 second thereof. For example, by introducing the two solutions into a mixing reactor through a pipe having the same cross sectional area and shape but divided into two conduits by a longitudinal separator which terminates at the baffles, or sufficiently close to the baffles to permit a limited retention time when the two solutions could contact each other. Preferably the retention time should be less than 0.1 second.

The baffled, mixing reactors require some energy to provide a homogeneous mixture to overcome the fluid flow pressure drop. This energy can be provided by maintaining a pressure (static head) on the hydrogen peroxide and sulfuric acid. The necessary static head can be determined experimentally without difficulty, or can be calculated, for example for a Koch SMV static mixer, by the equations, $$p=0.0045(Q^2/D^4)N(SG),$$

where

Q=the total solution flow rate,
D=the diameter of the SMX elements,
N=the number of SMX elements,
SG=the specific gravity of the product solution.

The required power can be determined by multiplying the pressure drop by the desired volumetric flow rate as explained in Koch Engineering Company's bulletin KSM-6.

The preferred design would be for the crossection area of the inlet ends of the reactor conduits to be enlarged to minimize sudden fluctuations in flow rates through the mixing reactor because of intermittent fluctuations in the flow rates of hydrogen peroxide or sulfuric acid into the conduits. However, there is no need to design the mixing reactor to limit the hydrostatic head in the reactor conduits because there is no accumulation of a mixture of hydrogen peroxide and sulfuric acid therein with the consequent potential for a run away reaction. The use of gravity feed into the reaction zone from the reactor conduits also assures maintaining the hydrostatic head in the reactor conduits within desirable limits. The use of pumps to feed the mixture from the reactor conduits into an undersized reaction zone under pressure is undesirable since a pump failure may result in an overly exothermic and uncontrolled reaction leading to an increased hydrostatic head being built up in the reactor conduits. By operating as described above, the Caro's acid is formed essentially on a continuous basis only in the reactor. Unlike the process of U.S. Pat. Nos. 5,439,663 and 5,470,564 the reactor can be sized using theoretical calculations for the pressure drop instead of eight times the theoretical pressure drop.

Because of the poor stability of the Caro's acid thus formed at the elevated reaction temperatures, it is typical for the Caro's acid to be formed on site where it is to be used in the particular application. In practice, the Caro's acid thus formed is passed directly into the stream to be treated (for example, effluents where Caro's acid is used to reduce its cyanide concentration) without storing or transporting of the thus formed Caro's acid.

BRIEF DESCRIPTION OF THE DRAWINGS

The invention will now be described with reference to the drawing. In FIG. 1, a plan view with the reactor conduits and reactor shown in cross section for clarity, the hydrogen peroxide is maintained in a storage tank 1 and passed via line 3 into pump 5 which pumps the liquid through line 7 into the first reactor conduit 17A. In similar fashion, the sulfuric acid is maintained in storage tank 9 and is passed through line 11 into pump 13 where the sulfuric acid is pumped through line 15 into the second reactor conduit 17B. The use of pumps 5 and 13 are optional since the reactants can also be passed by gravity into the top of the reactor conduits when pumping means are not required.

Figure 1:
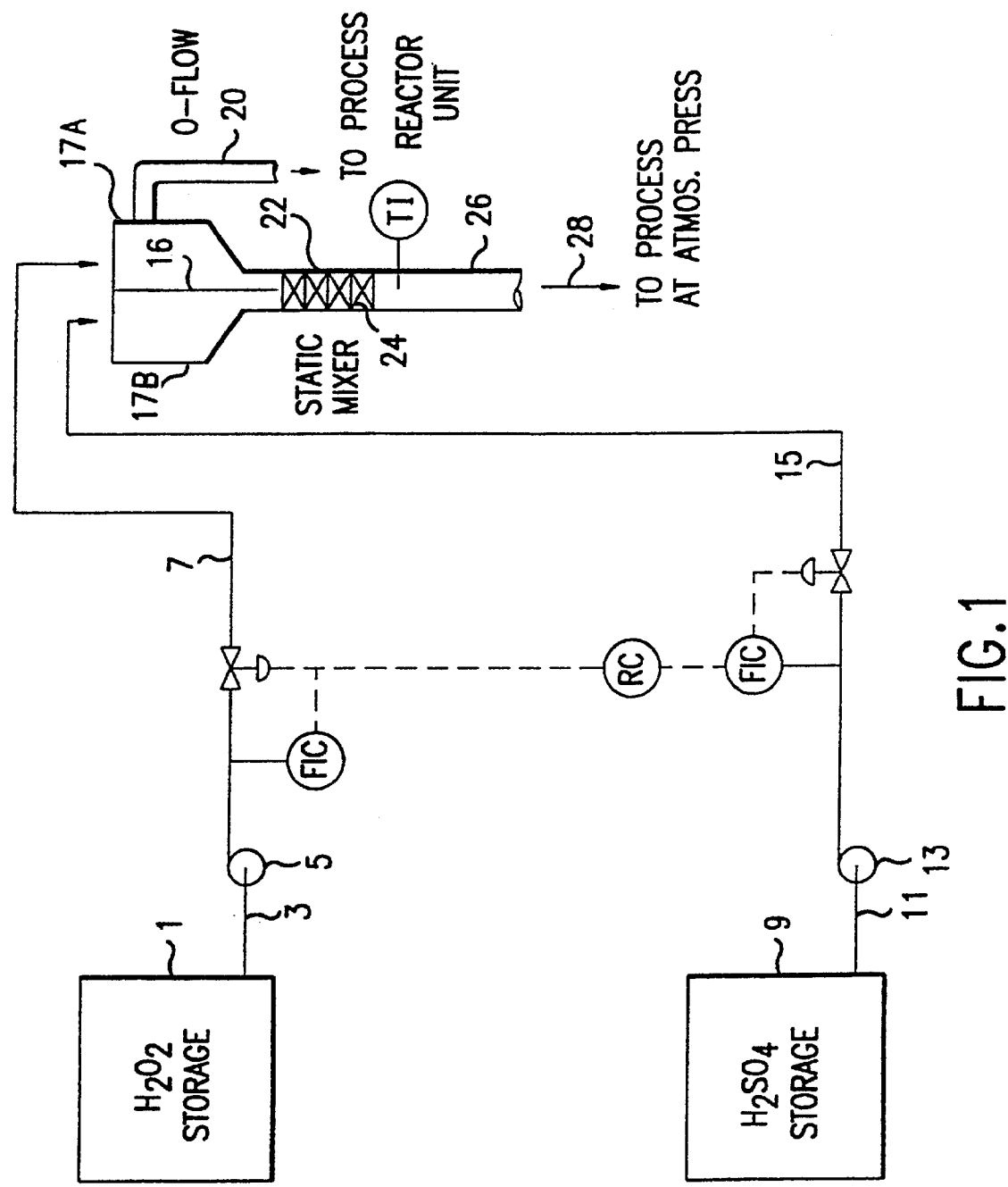
FIG. 1 is a flow sheet showing a preferred embodiment of the invention.

In either case, rate controllers are normally used in these lines to assure that the mole ratio of sulfuric acid to hydrogen peroxide is within the range of 1/1 to about 3/1 with 2/1 to about being preferred. The ends of lines 7 and 15 are located above the top of the reactor conduits 17A and 17B to assure that an air space always remains between the ends of these lines and the reactor conduits. This air space is necessary to assure that if the hydrogen peroxide or sulfuric acid overflow the top of the reactor conduits none of the liquids acid will enter either line 7 or line 15 and cause contamination of any of the storage tanks.

The reactor conduits 17A and 17B are shown fused in the form of a single cylindrical funnel 17 with a longitudinal partition 16. Partition 16 separating reactor conduits 17A and 17B extends from the top of funnel 17 to the surface of the baffles 24 in the mixing re/actor 22 to permit simultaneous adding of the reactants without substantial mixing. The tops of the reactor conduits are preferably left open to the atmosphere to prevent any pressure build up. If desired, a loosely fitted dust cover may be placed over the top of the funnel with appropriate openings for the ends of the feed lines 7 and 15. Dust covers serve to prevent unwanted particles and contamination from entering into the reactor conduits without forming a pressure cap.

In addition, the upper parts of the reactor conduits 17A and 17B normally are each equipped with an overflow, to simplify the drawing only overflow 20 is shown. The overflow 20 is designed to remove any overflowing liquid from the reactor conduit 20 which accumulates above the hold-up liquid level normally obtained and to remove this liquid from reactor conduits 17B before it overflows. Any liquid from line 20 can be retained in a tank (not shown) for reuse or disposal. The bottom of reactor conduits 17A and 17B are connected to mixing reactor 22. The sulfuric acid and hydrogen peroxide from reactor conduits 17A and 17B are then passed by gravity directly onto the baffles 24 of static reactor 22 without premixing. There the liquids are intimately mixed to maximize conversion to Caro's acid. Preferably the pipe-like mixing reactor 22 is a static mixer having internal elements 24, (usually 3 or 4), to facilitate intimate mixing of hydrogen peroxide and sulfuric acid. The static mixing reactor 22 is shown in a vertical orientation and this is the preferred embodiment for carrying out this process. However, it is possible to connect the static reactor to the reactor conduits with a curved connection and have the static reactor either in a horizontal or diagonal figuration. Whether oriented vertically, diagonally or horizontally in line the gravity fed mixture from the reactor conduits 17A and 17B will flow into and intimately react in the static reactor 22 and be converted to Caro's acid.

A typical static reactor is that produced by Koch Engineering Company containing four SMV (Registered TM) elements for intimately mixing and reacting the feed mixture to form Caro's acid. The exit 26 from the static reactor 22 conveys the Caro's acid mixture formed in the static reactor, at atmospheric pressure, to the application where the Caro's acid is being used. These include detoxification of cyanides and other well known applications for Caro's acid.

EXAMPLE

A solution of Caro's Acid was prepared by adding 7.37 grams of 70% hydrogen peroxide to 40 grams of 93% sulfuric acid contained in a beaker surrounded by a cracked ice water bath. The decomposition rate of Caro's acid produced was determined by placing 0.2 to 0.3 grams of the Caro's acid in a plastic weighing boat which was floated on water maintained at 75° C. and at 92° C. At varying times the weighing boats containing the samples were added to a cracked ice mixture and titrated for Caro's acid and hydrogen peroxide using standardized ascorbic acid and standard ceric sulfate respectively. The results were plotted and it was found that the decomposition rate was 0.16% per second at 75° and 0.61% per second at 92° C.

This example shows that a short retention time of 5 seconds or less is important at any temperature because of a substantial reduction in decomposition. However, as the decomposition releases heat, it will raise the temperature and the decomposition rate will rise exponentionally with the increased temperature, further increasing the decomposition rate. However, if the hydrogen peroxide and sulfuric acid are not fully mixed before contacting the baffles of the mixing reactor some small areas may start decomposing, releasing the heat of decomposition further increasing the rate of decomposition and generating oxygen gas and possibly steam, causing an increased pressure drop in the baffled mixing reactor. It is believed that this is the cause of the greater than theoretical pressure drop observed in U.S. Pat. Nos. 5,439,663 and 5,470,564.

The practical importance of this invention becomes clearer from the following recalculation of the example of U.S. Pat. Nos. 5,439,663 and 5,470,564. In this recalculation a 1 inch SMV static mixer having four elements (N=4) is fitted to the 1 inch opening of a funnel expanding outward at 57° to a diameter of 12 inches. (The bottom of the funnel being in the same plane as the top element of the static mixer). According to the flow rate equation, at a flow rate of 1 gallon per minute of Caro's acid the height of the solution in the funnel would be 4.5 inches, and the residence time of the solution in the funnel portion would be 16 seconds. At a temperature of 92° C. you would have sufficient decomposition to decrease the yield of Caro's acid by 10%. However, with the present invention there would be no premixing resulting in no 10% decomposition loss of hydrogen peroxide to oxygen gas, and, in addition, would have at least a threefold increase in capacity of the static mixer owing to a lower pressure drop because the decreased conversion of hydrogen peroxide to oxygen gas.

What is claimed is:

1. A process for producing Caro's acid comprising introducing hydrogen peroxide having a concentration of at least 50% by weight through a first feed line into a first reactor conduit open to the atmosphere and introducing sulfuric acid having a concentration of at least 85% by weight through a second feed line into a second reactor conduit open to the atmosphere, proportionally adjusting the rate of flow of the hydrogen peroxide into the first reactor conduit and of the sulfuric acid into the second reactor conduit to maintain the desired mole ratio and to provide a hydrostatic head of hydrogen peroxide and sulfuric acid, thereby independently introducing the hydrogen peroxide from the first reactor conduit and the sulfuric acid from the second reactor conduit by gravity directly into a baffled, plug flow mixing reactor without premixing of the sulfuric acid and the hydrogen peroxide, and removing a Caro's acid reaction mixture from the exit end of the plug flow mixing reactor.

2. The process of claim 1 wherein the baffled plug flow reactor is a static mixer.

\* \* \* \* \*